United States Patent
Inuzuka et al.

(10) Patent No.: US 7,530,601 B2
(45) Date of Patent: May 12, 2009

(54) SEATBELT RETRACTOR AND SEATBELT APPARATUS USING THE SAME

(75) Inventors: Koji Inuzuka, Tokyo (JP); Koji Tanaka, Tokyo (JP)

(73) Assignee: Takata Corporation, Tokyo (JP)

( * ) Notice: Subject to any disclaimer, the term of this patent is extended or adjusted under 35 U.S.C. 154(b) by 280 days.

(21) Appl. No.: 11/419,667

(22) Filed: May 22, 2006

(65) Prior Publication Data
US 2006/0267330 A1 Nov. 30, 2006

(30) Foreign Application Priority Data
May 26, 2005 (JP) .............. 2005-153804

(51) Int. Cl.
*B60R 22/34* (2006.01)
(52) U.S. Cl. .................. 280/807; 242/379.1; 297/475
(58) Field of Classification Search ............. 280/807, 280/808; 242/390.8–390.9, 379.1; 297/474–478
See application file for complete search history.

(56) References Cited

U.S. PATENT DOCUMENTS

| | | | |
|---|---|---|---|
| 5,248,110 A | | 9/1993 | Hiruta et al. |
| 6,722,601 B2 * | | 4/2004 | Kohlndorfer et al. ..... 242/379.1 |
| 2004/0169105 A1 | | 9/2004 | Wier |
| 2004/0179887 A1 * | | 9/2004 | Hui et al. ...................... 401/55 |
| 2005/0012320 A1 | | 1/2005 | Tobata |
| 2005/0029382 A1 | | 2/2005 | Inuzuka et al. |
| 2006/0226274 A1 * | | 10/2006 | Nomura ................... 242/379.1 |
| 2006/0266865 A1 * | | 11/2006 | Tanaka et al. ................ 242/374 |

FOREIGN PATENT DOCUMENTS

| | | |
|---|---|---|
| EP | 1 498 325 A1 | 1/2005 |
| EP | 1 504 971 A2 | 2/2005 |
| EP | 1 504 971 A3 | 6/2005 |

OTHER PUBLICATIONS

A search report dated Oct. 6, 2006, from the European Patent Office in corresponding European Application No. 06012162.1/2421.
Inoue, Katsumi et al. "Optimum Stiffener Layout for the Reduction of Vibration and Noise of Gearbox Housing," Journal of Mechanical Design. vol. 124, pp. 518-523. (Sep. 2002).

* cited by examiner

*Primary Examiner*—Ruth IIan
*Assistant Examiner*—Drew J. Brown
(74) *Attorney, Agent, or Firm*—Fitch, Even, Tabin & Flannery

(57) ABSTRACT

A motor-driven seatbelt retractor is provided in which vibrations of a cover can be minimized while minimizing increase in weight. In one form, a predetermined number of ribs are provided on a thin plate portion of a cover of a power transmission gear mechanism. These ribs extend in parallel with each other from top to bottom (in a vertical direction) of a seatbelt retractor. Since rigidity of the cover is increased by these ribs, even though vibrations are generated when a motor is driven and the power transmission gear mechanism is operated respectively, the cover is prevented effectively from being vibrated due to the vibrations of these members. Accordingly, generation of noise due to the vibrations of the cover can also be effectively restrained.

9 Claims, 4 Drawing Sheets

SEATBELT RETRACTOR AND SEATBELT APPARATUS USING THE SAME

FIELD OF THE INVENTION

The present invention relates to a technical field of a seatbelt retractor provided on a vehicle such as a motor vehicle for retracting a seatbelt for constraining and protecting a passenger by transmitting a drive torque of a motor to a spool by a power transmission mechanism and a seatbelt apparatus using the same.

BACKGROUND OF THE INVENTION

A seatbelt apparatus provided on a vehicle such as a motor vehicle prevents a passenger from jumping out from a seat by constraining the passenger by a seatbelt in case of emergency such as collision or the like where a large deceleration is applied to a vehicle and protects the passenger. The seatbelt apparatus is provided with a seatbelt retractor which constantly urges a spool for retracting the seatbelt in the belt retracting direction and prevents the seatbelt from being withdrawn by activating an emergency locking mechanism (ELR mechanism) upon emergency described above to lock rotation of the spool in the withdrawing direction.

As a seatbelt retractor as described above, a motor retractor that retracts and withdraws the seatbelt by rotating the spool by the drive torque of the motor is proposed in the related art (for example, see Japanese Unexamined Patent Application Publication No. 2005-35485). According to the motor retractor in this type, since a tensile force of the seatbelt can be controlled by retracting the seatbelt by the motor, a wearing mode of the seatbelt can be set variously and hence constraint of the passenger by the seatbelt can be performed more suitably and meticulously according to a traveling state or the like of the vehicle.

The motor retractor disclosed in Japanese Unexamined Patent Application Publication No. 2005-35485 employs a power transmission gear mechanism having a predetermined number of gears as a power transmission mechanism for transmitting the drive torque of the motor to the spool. By covering the power transmission gear mechanism with a cover, foreign substances are prevented from coming into contact with or entering into the power transmission gear mechanism from the outside or entering between the gears that mesh with each other, and an operation noise which is generated when the power transmission gear mechanism is operated is constrained from leaking outside.

The motor retractor disclosed in Japanese Unexamined Patent Application Publication No. 2005-35485 is not provided with spring means for retracting the seatbelt when the seatbelt is not worn, which is provided in conventional seatbelt retractors, which is not driven by the motor. A motor retractor having such the spring means is also proposed (for example, see Japanese Unexamined Patent Application Publication No. 2005-53422).

The motor retractor disclosed in Japanese Unexamined Patent Application Publication No. 2005-53422 employs the power transmission gear mechanism having a predetermined number of gears as the power transmission mechanism for transmitting the drive torque of the motor to the spool, and is provided with the cover for covering the power transmission gear mechanism for the same object as Japanese Unexamined Patent Application Publication No. 2005-35485.

However, in the motor retractor in the related art disclosed in Japanese Unexamined Patent Application Publication No. 2005-53422, a cover a is formed of a thin plate-shaped material for covering the power transmission gear mechanism and a thin plate portion b which is relatively thin is present as shown in FIG. 4. Therefore, by covering the power transmission gear mechanism with the cover, leakage of the operation noise generated in the power transmission gear mechanism toward the outside can be constrained to some extent. However, the cover itself vibrates due to vibrations generated by the operation of the motor retractor such as vibrations generated when the motor is being driven or vibrations generated when the gears of the power transmission gear mechanism are rotating, whereby noise caused by the vibrations of the cover may be generated.

As a countermeasure, it is conceivable to form the cover with a relatively thick plate-shaped material. However, when the cover is formed simply of the thick material, there may arise a problem such that the mass of material required for the cover is significantly increased.

Such a problem is dormant in the cover of the power transmission gear mechanism of the motor retractor disclosed in Japanese Unexamined Patent Application Publication No. 2005-35485 as well as in other covers of the power transmission gear mechanism of the motor retractor in the related art.

SUMMARY OF THE INVENTION

In view of such circumstances, it is an object of the present invention to provide a motor-driven seatbelt retractor in which vibrations of a cover can be minimized while minimizing increase in mass of required material, and a seatbelt apparatus using the same.

In order to solve the above-described problem, a seatbelt retractor according to one form of the present invention at least includes a spool for retracting a seatbelt, a motor for generating a drive torque for rotating the spool, a power transmission mechanism for transmitting the drive torque of the motor to the spool, and a cover for covering the power transmission mechanism, and is characterized in that the cover is provided with vibration restraining device for restraining vibration of the cover generated due to vibrations caused by driving the motor and operating the power transmission mechanism.

The seatbelt retractor according to a preferred form of the present invention is characterized in that the vibration restraining device is a rigidity increasing device for increasing rigidity of the cover.

The seatbelt retractor according to another preferred form of the present invention is characterized in that the rigidity increasing device is formed of a rib provided on the cover.

A seatbelt apparatus according to another form of the present invention at least includes a seatbelt for constraining a passenger, a seatbelt retractor for retracting the seatbelt so as to be capable of being withdrawn, a tongue supported by the seatbelt so as to be capable of sliding, and a buckle provided on a vehicle body or a vehicle seat so that the tongue can be engaged with, and is characterized in that the seatbelt retractor is the seatbelt retractor according to any one of above-described retractors.

With the seatbelt retractor configured as described above, since the vibration restraining device for the cover is provided, even though vibrations are generated when the motor is driven and the power transmission mechanism is operated respectively, the cover is effectively restrained from vibrating due to the vibrations of these members. Accordingly, generation of noise due to the vibrations of the cover can be restrained effectively.

In particular, with the seatbelt retractor according to the preferred forms, since the rigidity increasing device for increasing rigidity of the cover is provided, rigidity of the cover can be increased. Accordingly, vibrations of the cover can be restrained, whereby the generation of noise due to the vibrations of the cover can effectively be restrained. In addition, by combining a leakage restraining function of the cover for restraining leakage of the operation noise of the power transmission gear mechanism toward the outside, noise caused by leakage of the operation noise of the power transmission gear mechanism toward the outside can also be shut down effectively. Therefore, the noise outside the cover occurring when the motor is being driven and the power transmission gear mechanism is being operated can be restrained further effectively.

With the invention according to the other preferred form, since the rigidity increasing device is formed of the rib provided on the cover, the rigidity increasing device can be configured in a simple structure, and increase in mass of the required material can be minimized.

In addition, according to the seatbelt apparatus of the present invention, since the seatbelt retractor according to any one of the earlier described forms is employed as the seatbelt retractor, the noise generated when the motor of the seatbelt retractor is being driven and the power transmission gear mechanism thereof is being operated can be restrained, whereby a cabin can be a comfortable space during the drive of the vehicle.

BRIEF DESCRIPTION OF THE DRAWINGS

FIGS. 2(a) and 2(b) are schematic drawings of the seatbelt retractor in the example shown in FIG. 1, in which FIG. 2(a) is a perspective view and FIG. 2(b) is a partially enlarged perspective view showing part of a cover of a power transmission mechanism in an enlarged scale.

DETAILED DESCRIPTION OF THE PREFERRED EMBODIMENTS

Figure 1:
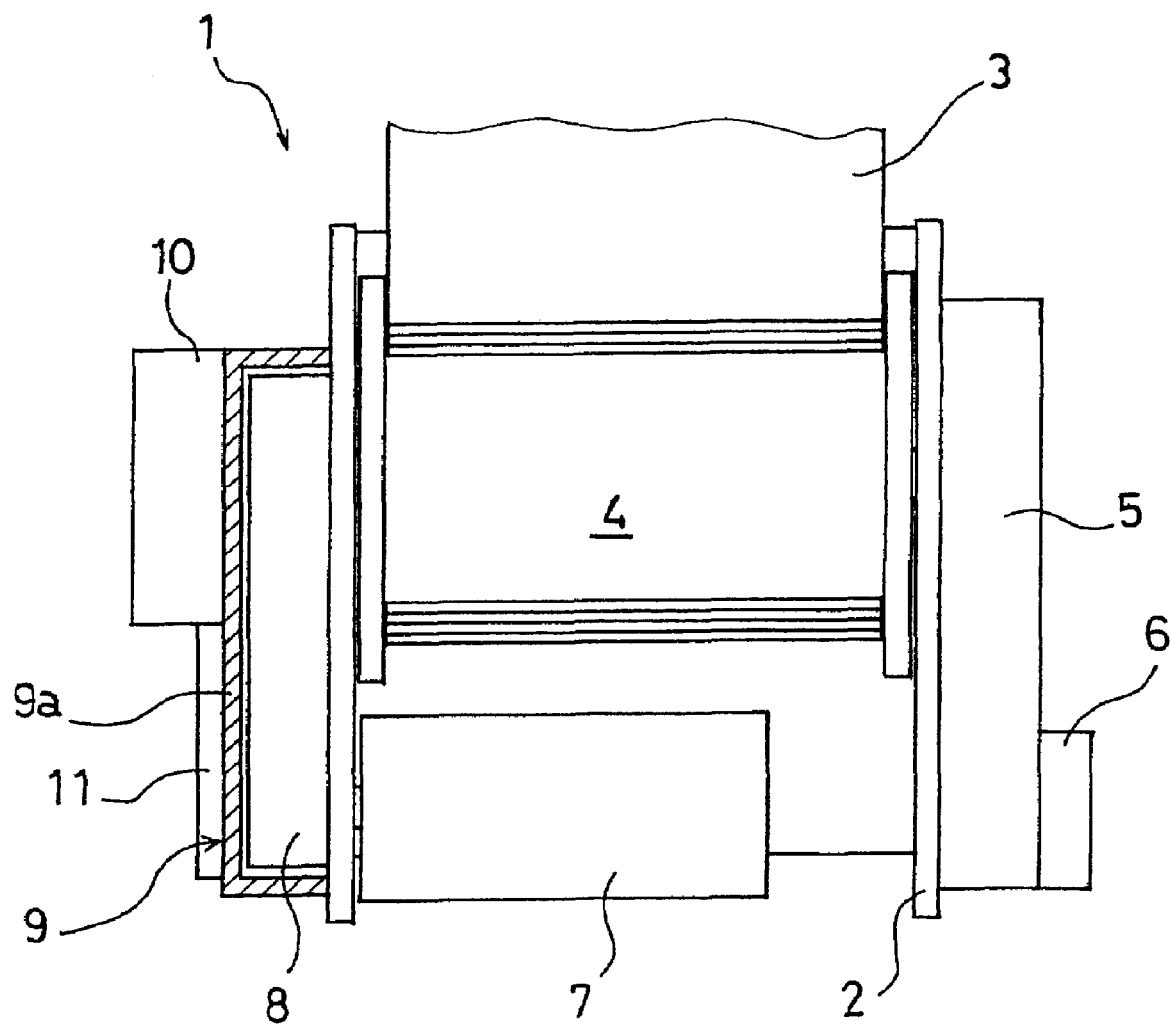
FIG. 1 is a sketch drawing showing an example of an embodiment of a seatbelt retractor according to the present invention.

Referring now to the drawings, a best mode for carrying out the present invention will be described.

FIG. 1 is a sketch drawing showing an example of an embodiment of a seatbelt retractor according to the present invention.

Figure 2B:
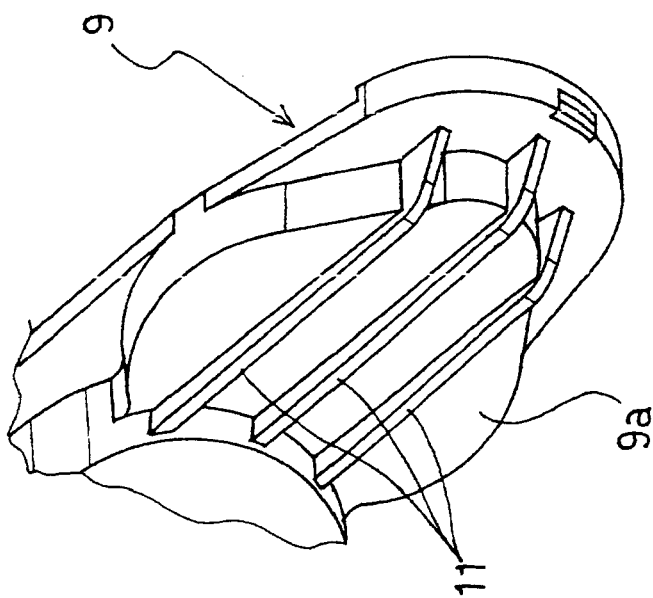
Figure 2A:
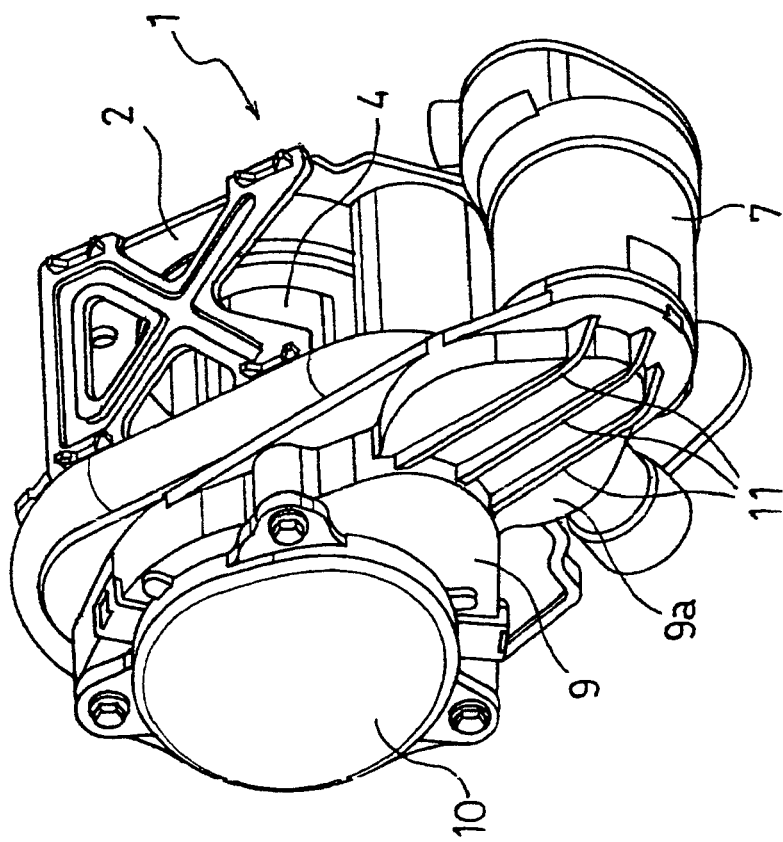

FIGS. 2(a) and 2(b) are schematic drawings of the seatbelt retractor in this example, in which FIG. 2(a) is a perspective view and FIG. 2(b) is a partially enlarged perspective view showing part of a cover of a power transmission mechanism in an enlarged scale.

As shown in FIG. 1, a seatbelt retractor 1 in this example roughly includes a frame 2, a seatbelt 3 that constrains a passenger when needed, a spool 4 that retracts the seatbelt 3 so as to be capable of being withdrawn, locking device 5 as an ELR mechanism that is provided on one side of the frame 2 and is activated upon a significant deceleration exceeding predetermined deceleration such as a collision and prevents rotation of the spool 4 in a belt withdrawing direction, deceleration sensing means (vehicle sensor) 6 that is activated when deceleration exceeding a predetermined value is applied to a vehicle to activate the locking device 5, a motor 7 that generates a drive torque to be applied to the spool 4, a power transmission gear mechanism (corresponding to the power transmission mechanism of the present invention) 8 that reduces the speed of the drive torque of the motor 7 and transmits the same to the spool 4, a cover 9 fixed to the frame 2 for covering the power transmission gear mechanism 8, and spring member 10 for constantly urging the spool 4 in a retracting direction.

The frame 2, the seatbelt 3, the spool 4, the locking device 5, the deceleration sensing means (vehicle sensor) 6, the motor 7, and the power transmission gear mechanism 8 and the spring member 10 are all the same as those in Japanese Unexamined Patent Application Publication No. 2005-53422 described above. As shown in FIG. 2, the cover 9 of the power transmission gear mechanism 8 is the same as the cover of the power transmission gear mechanism in Japanese Unexamined Patent Application Publication No. 2005-53422 other than a portion shown in FIGS. 2(a) and 2(b).

In other words, as shown in FIGS. 2(a) and 2(b), in the cover 9 of the power transmission gear mechanism 8 in this example, a part that covers a motor gear (not shown) provided on a revolving shaft of the motor 7 as part of the power transmission gear mechanism 8 corresponds to a thin plate portion 9a and a predetermined number (three in the example shown in the drawing) of ribs 11 are provided on the thin plate portion 9a. The ribs 11 extend in parallel with each other from top to bottom (vertical direction) of the seatbelt retractor 1. These ribs 11 may be extended in a lateral direction (horizontal direction) of the seatbelt retractor 1 or may be extended in an oblique direction with respect to the vertical and lateral directions, or may be formed into a grid. These ribs 11 serve to increase rigidity of the thin plate portion 9a of the cover 9, and these ribs 11 constitute a rigidity increasing device and a vibration retraining device of the present invention.

According to the seatbelt retractor 1 in this example configured as described above, the ribs 11 are provided on the thin plate portion 9a of the cover 9 to enhance the rigidity of the cover 9. Therefore, even though vibrations are generated when the motor 7 is driven and hence the power transmission mechanism 8 is operated, the cover 9 is effectively restrained from vibrating due to the vibrations of these members. Accordingly, generation of noise due to the vibrations of the cover 9 can be restrained effectively.

In addition, noise caused by leakage of the operation noise of the power transmission gear mechanism 8 toward the outside can be shut down efficiently by combining a leakage restraining function of the cover 9 for restraining leakage of the operation noise of the power transmission gear mechanism 8 toward the outside. Therefore, the driving noise of the motor 7 and the operation noise of the power transmission gear mechanism 8 toward the outside of the cover 9 can be shut down further effectively.

Since the cover 9 must only be provided with the ribs 11, the rigidity increasing device can be configured into a simple structure, and increase in mass of material required for the cover 9 can be minimized.

The seatbelt retractor 1 can be applied to the seatbelt retractor 1 employed in the seatbelt apparatus known in the related art.

Figure 3:
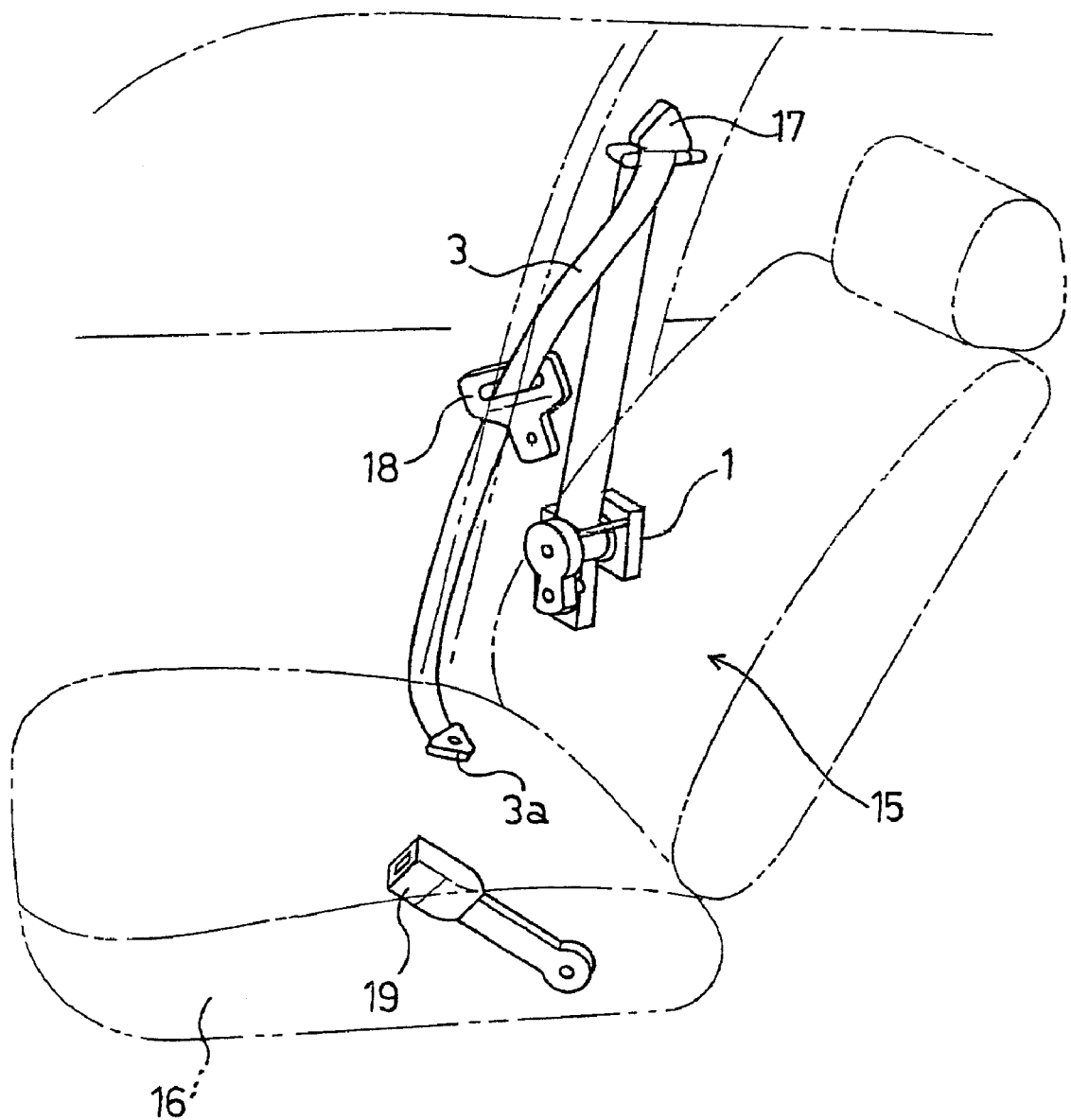
FIG. 3 is a sketch drawing showing an example of a seatbelt apparatus using the seatbelt retractor in the example shown in FIG. 1.
Figure 4:
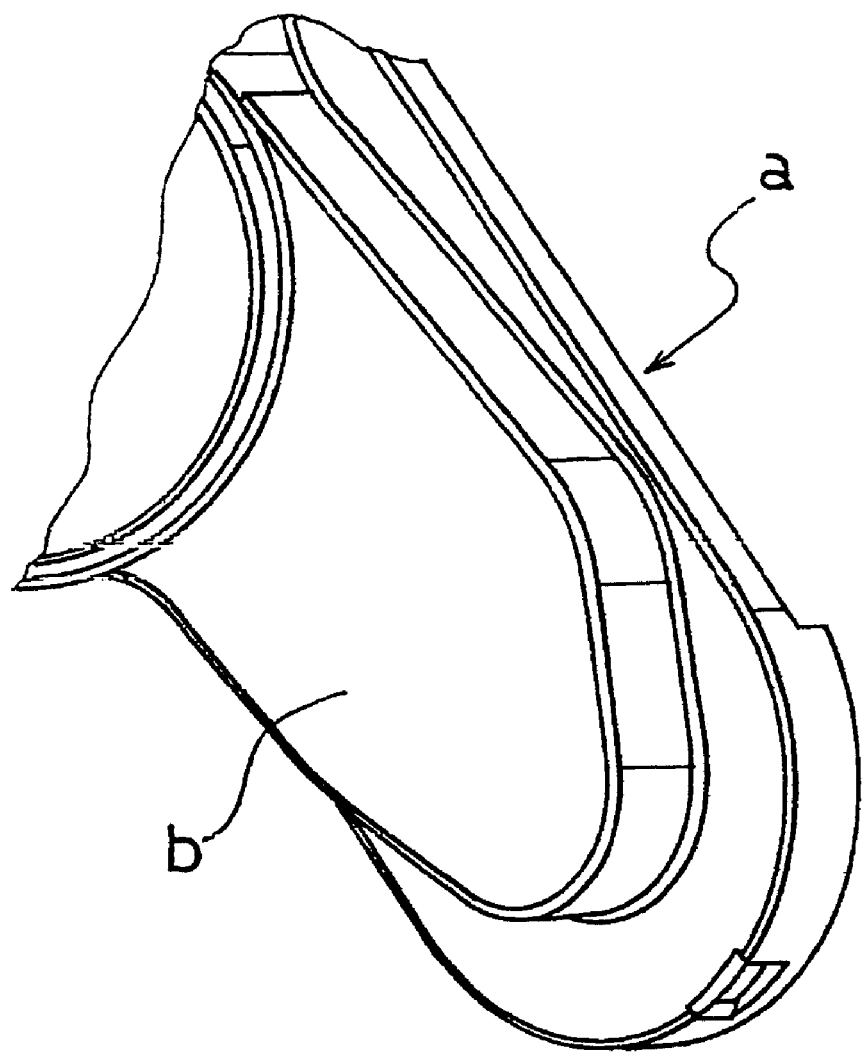
FIG. 4 is a partially enlarged cross-sectional view like FIG. 2(b) for explaining drawbacks of a power transmission gear mechanism in a motor retractor in the related art.

FIG. 3 is a sketch drawing showing an example of the seatbelt apparatus using the seatbelt retractor in this example.

As shown in FIG. 3, a seatbelt apparatus 15 in this example includes the seatbelt retractor 1 in this example fixed to a vehicle body, the seatbelt 3 to be withdrawn from the seatbelt retractor 1 and to be fixed to a floor of the vehicle body or a vehicle seat 16 via a belt anchor 3a at a distal end thereof, a guide anchor 17 for guiding the seatbelt 3 withdrawn from the seatbelt retractor 1 to a shoulder of the passenger, a tongue 18 supported by the seatbelt 3 guided from the guide anchor 17 so as to be capable of sliding movement, and a buckle 19 which is fixed to the floor of the vehicle body or the vehicle seat and which the tongue 18 is inserted in and engaged with so as to be capable of engagement and disengagement.

The effects and advantages of the seatbelt apparatus 15 in this example is the same as the effects and advantages of the seatbelt retractor 1 described above, and the effects and advantages of other parts are the same as the effects and advantages of the seatbelt apparatus known in the related art.

According to the seatbelt apparatus 15 in this example, since the seatbelt retractor 1 in this example is used, the noise generated when the motor 7 of the seatbelt retractor 1 is being driven and the power transmission gear mechanism 8 thereof is being operated can be restrained, whereby a cabin can be a comfortable space during the drive of the vehicle.

In the example described above, the vibration restraining device of the cover 9 is configured of the ribs 11. However, instead of the ribs 11, any other known vibration restraining device, for example, the vibration restraining device such as rubber provided between the cover 9 and the frame 2 for restraining vibrations from being transmitted from the frame 2 to the cover 9 can be employed as long as it can restrain vibrations from being transmitted from the frame 2 to the cover 9 and it can be applied to the seatbelt retractor 1.

The power transmission gear mechanism 8 and the cover 9 employed in the example shown above are the power transmission gear mechanism and the cover disclosed in Japanese Unexamined Patent Application Publication No. 2005-53422. However, they are not limited thereto, and may be any known power transmission gear mechanism, for example, the power transmission gear mechanism and the cover disclosed in Japanese Unexamined Patent Application Publication No. 2005-35485 as long as they are the power transmission gear mechanism and the cover that can be applied to the motor retractor. Furthermore, the power transmission mechanism is not limited to the power transmission gear mechanism, and may be any known power transmission mechanism such as a power transmission mechanism composed of a pulley and an endless belt as long as it can be applied to the motor retractor.

In addition, the spring member 10 may be omitted as in the case of the seatbelt retractor disclosed in Japanese Unexamined Patent Application Publication No. 2005-35485.

What is claimed is:

1. A seatbelt retractor comprising:
a spool for retracting a seatbelt;
a motor for generating a drive torque for rotating the spool;
a power transmission mechanism for transmitting drive torque from the motor to the spool;
a cover for covering the power transmission mechanism;
offset portions of the cover including raised and lowered surfaces and a curved shoulder surface extending therebetween; and
a plurality of elongate parallel ribs extending across the raised surface from one end thereof to the shoulder surface and beyond to terminate on the lowered surface spaced from the curved shoulder surface for increasing rigidity and restraining vibration of the cover generated due to vibrations caused by operation of the motor and the power transmission mechanism.

2. The seatbelt retractor of claim 1 in combination with the seatbelt for constraining a passenger, a tongue supported by the seatbelt so as to be capable of sliding thereon, and a buckle mounted to a vehicle body or a vehicle seat to allow the tongue to be releasably locked therewith for keeping the passenger constrained on the vehicle seat.

3. The seatbelt retractor of claim 1 wherein the cover offset portions comprise thin plate portions, and the plurality of ribs comprises narrow portions integral with and raised from the thin plate portion and spaced from each other across the thin plate portion to increase thickness of the cover thin plate portion portions locally at the narrow portions thereof.

4. The seatbelt retractor of claim 1 including a frame for supporting the motor and power transmission mechanism, and the plurality of ribs substantially keeps vibrations of the frame due to motor and power transmission mechanism operation from causing vibrations of the cover.

5. A motorized seat belt retractor comprising:
a rotatable spool having seatbelt webbing thereon;
a motor operable to rotate the spool for seatbelt webbing retraction thereon and protraction therefrom;
a power transmission mechanism between the motor and the spool operable to transmit drive torque from the motor to the spool;
a cover mounted to extend over at least a portion of the power transmission mechanism to minimize noise generated by operation of the motor and the power transmission mechanism;
raised, intermediate and lowered surface portions of the cover having shoulder surface portions between the raised and intermediate surface portions, and the intermediate and lowered surface portions; and
a plurality of elongate, parallel and variable height ribs each having opposite ends with one end at the shoulder surface portion between the raised and intermediate surface portions and the other end on the lowered surface portion so that the ribs each have a first portion that extends continuously across the intermediate surface portion with a first height and a second portion that extends beyond the shoulder surface portion between the intermediate and lowered surface portions to the other end of each of the ribs with a second height that is greater than the first height providing the cover with rigidity for minimizing vibrations thereof due to motor and power transmission mechanism operation.

6. The motorized seatbelt retractor of claim 5 wherein the elongate, parallel ribs are narrower than the wider spacing between adjacent ribs.

7. A seatbelt apparatus comprising:
a seatbelt associated with a vehicle seat;
a tongue on the seatbelt;
a buckle for receiving the tongue releasably latched therewith to secure a passenger on the seat;
a seatbelt retractor from which the seatbelt is withdrawn;
a drive system of the seatbelt retractor operable for retracting the seatbelt in the retractor and protracting the seatbelt from the retractor;
a ribbed cover extending over at least a portion of the drive system to substantially keep noise from operation of the drive system from being audible to the passenger with vibration of the ribbed cover kept to a minimum;
an inner smooth, flat surface of the cover facing the drive system in close proximity thereto;
an outer surface of the cover facing away from the drive system and having a raised surface portion, a lowered surface portion and a shoulder surface portion extending therebetween; and
a plurality of elongate, parallel ribs extending from the shoulder surface portion continuously across the lowered surface portion.

8. The seatbelt apparatus of claim 7 wherein the retractor includes a rotatable spool, and the drive system comprises a motor and transmission gears for transmitting drive torque from the motor to the spool with the ribbed cover extending over the transmission gears.

9. The seatbelt apparatus of claim 7 wherein the rectractor has lateral sides with a lateral width of the retractor defined therebetween, the ribbed cover is disposed at one of the retractor lateral sides, and the plurality of ribs are raised from the lowered surface portion so that tops of the ribs at the shoulder surface portion are below the raised surface portion to avoid increasing the lateral width of the retractor beyond the raised surface portion at the one lateral side of the retractor.

* * * * *

UNITED STATES PATENT AND TRADEMARK OFFICE
CERTIFICATE OF CORRECTION

PATENT NO.         : 7,530,601 B2
APPLICATION NO. : 11/419667
DATED                : May 12, 2009
INVENTOR(S)       : Koji Inuzuka et al.

It is certified that error appears in the above-identified patent and that said Letters Patent is hereby corrected as shown below:

Claim 3, Column 6, Line 3, delete "off set" and insert -- offset --.

Claim 3, Column 6, Line 8, delete "portion portions" and insert -- portion --.

Claim 5, Column 6, Line 14, delete "seat belt" and insert -- seatbelt --.

Claim 9, Column 7, Line 6, delete "rectractor" and insert -- retractor --.

Signed and Sealed this

Fifteenth Day of September, 2009

David J. Kappos
*Director of the United States Patent and Trademark Office*